Patented Jan. 12, 1932

1,841,138

UNITED STATES PATENT OFFICE

GERALD H. MAINS, OF WILKINSBURG, PENNSYLVANIA, ASSIGNOR TO WESTINGHOUSE ELECTRIC & MANUFACTURING COMPANY, A CORPORATION OF PENNSYLVANIA

COATING COMPOSITION

No Drawing. Application filed October 1, 1927. Serial No. 223,483.

My invention relates to liquid coating compositions and more particularly to varnishes containing a synthetic resin of the phenolic condensation type.

An object of this invention is to provide a liquid coating composition containing a phenolic condensation product and a vegetable oil that is especially adapted for the purpose of coating sheets of fabric material, a plurality of such sheets being subsequently molded under heat and pressure to form composite plates.

Another object of this invention is to provide a fabric sheet material, the fibers of which are coated, with a varnish film consisting essentially of a resin of the phenolic condensation type and a vegetable oil, the vegetable oil being present in such proportions that treated sheets will not adhere to each other at ordinary temperatures, but will be free from powder or dust which has heretofore been an objectionable characteristic of such films.

Resins of the phenolic condensation type, such as those formed by the reaction of phenol and formaldehyde, phenol and furfural, or cresylic acid and furfural, when dissolved in a suitable solvent, such as alcohol or a mixture of alcohol and benzol, form varnishes which find extensive use as coating compositions for impregnating fibrous and other sheet material. When a plurality of such sheets are subsequently molded under heat and pressure, they form composite plates of great strength and durability. The resinous material remaining on the surfaces of sheets impregnated with varnishes of the character just mentioned, after evaporation of the solvent, preparatory to the molding operation, not only does not possess sufficient tackiness but is partially in the form of dust which will be imparted to the adjacent atmosphere, thus rendering it injurious to workmen. The loss of resin, under the conditions just stated, is also considerable.

Efforts have been made to avoid the above specified conditions by reducing the drying time of the varnish film or the temperature at which it is dried. Such efforts resulted, however, in producing a film in which the resin was not properly cured or one from which the solvent was not completely evaporated and, when sheets impregnated with such films were subsequently molded together into composite plates, a product having inferior electrical and physical properties was obtained.

I have made the discovery that, by adding a small percentage of a vegetable oil, such as China wood oil, linseed oil or castor oil, to a varnish containing a resin of the phenolic condensation type, an improved varnish is produced which, when used for impregnating paper or other sheet material produces a film possessing a surface of sufficient tackiness and one wholly free from dust. Impregnated fibrous sheets are thus produced which may be molded into a composite article having excellent dielectric and physical properties.

The usual manner of making varnishes of this type is to dissolve the synthetic resin in a suitable solvent, such as alcohol or a mixture of alcohol and benzol, the varnish containing about 60% resin and about 40% solvent, although it will be understood that other appropriate solvents may be used and the proportions of resin and solvent may be varied to suit particular requirements. For example, in varnish sludge, only a small percentage of solvent may be present while, in other cases, the quantity of the solvent used may be as high as 75 to 80%.

Vegetable oils, as a rule, are not soluble in the ordinary synthetic-resin solvents, so that it usually will be desirable to dissolve the oil in a suitable solvent which is also a solvent for the resin, so that, when the resulting solution is added to the dissolved resin, a clear solution will be obtained. It will be understood, however, that if the vegetable oil is soluble in the resin solvent, an additional solvent for the vegetable oil will not be required. Castor oil is an example of this type, as it is readily soluble in alcohol which is also a solvent for the resin.

The following specific example will serve to illustrate my invention. One to two parts, by weight, of China wood oil was dissolved in five to ten parts of benzol and the resulting mixture added to one hundred parts of a varnish containing 60 parts resin and 40 parts solvent.

Another example of a varnish having very desirable characteristics was made by dissolving one to two parts of China wood oil in five to ten parts of furfural and adding the resulting solution to one hundred parts of a varnish containing sixty parts resin and forty parts solvent.

Furfural is especially adapted as a solvent medium for introducing the vegetable oil into the varnish as it is not only a solvent for the vegetable oil, but also for the resin and has the advantage of accelerating the reaction of the resin and making the resultant molded product more nearly moisture resistant.

The resin used in the above cited examples was made by the reaction of cresylic acid and furfural. Various other resins however, may be used; for example, a resin formed by the reaction of phenol and formadehyde or by the reaction of phenol and furfural. Synthetic resins of this type are characterized by the fact that they are rendered infusible when subjected to heat and pressure.

While I have specified, in the above examples, various proportions of the ingredients that may be mixed together to form a coating composition that will be free from the objectionable characteristics mentioned, it will be understood that various modifications may be made; for example, other solvents may be used to dissolve the resin, such as acetone, toluol, xylol or methyl furfural, and the amount of the solvents, in proportion to the amount of resin, may be varied to suit various requirements. It is essential, however, that the vegetable oil be added only within certain well defined limits. When too large a quantity of the oil is added, sheets impregnated with the varnish will have the tendency to be sticky and will adhere to each other and to the mold when they are subsequently subjected to heat and pressure.

Furthermore, composite plates made from sheets containing excessive amounts of oil will be mottled in appearance and will exude oil. When too small a quantity of the vegetable oil is added, the objectionable dust formation is not entirely avoided. It has been found that the addition of more than 5% of oil is undesirable. About 1.5% to 3% of oil, based upon the amount of resin in the varnish, has been found preferable.

While I have described a specific embodiment of my invention, various modifications may be made therein without departing from the spirit or scope of my invention, as defined in the appended claims.

I claim as my invention:

1. A liquid coating composition comprising a reaction product of phenolic body and furfural, a solvent for said reaction product and a solution of China wood oil in furfural, the China wood oil being present in such proportions that fibrous sheets impregnated with said composition and subsequently dried will not adhere to each other at ordinary temperatures, but will be free from dust.

2. A liquid coating composition comprising a synthetic resin of the phenolic condensation type, a solvent for said resin, China wood oil and a sufficient amount of furfural to dissolve the China wood oil, the China wood oil being present in amounts ranging from 1% to 5% of the weight of the resin so that a plurality of superimposed fibrous sheets impregnated with said composition and subsequently dried will not adhere to each other at ordinary temperatures, but will be free from dust.

3. A liquid coating composition comprising a reaction product of cresylic acid and furfural, a solvent for said reaction product and a solution of China wood oil in furfural, the China wood oil being present in such proportions that fibrous sheets impregnated with said composition and subsequently dried will not adhere to each other at ordinary temperatures, but will be free from dust.

In testimony whereof, I have hereunto subscribed my name this 28th day of September, 1927.

GERALD H. MAINS.